US012627222B2

(12) United States Patent
Wijekoon et al.

(10) Patent No.: US 12,627,222 B2
(45) Date of Patent: May 12, 2026

(54) MATRIX POWER CONVERTER AND METHOD FOR USE IN THE MATRIX POWER CONVERTER

(71) Applicant: Huawei Technologies Co., Ltd., Shenzhen (CN)

(72) Inventors: Piniwan Thiwanka Bandara Wijekoon, Nuremberg (DE); Anatolii Tcai, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/486,721

(22) Filed: Oct. 13, 2023

(65) Prior Publication Data

US 2024/0039400 A1 Feb. 1, 2024

Related U.S. Application Data

(63) Continuation of application No. PCT/EP2021/059796, filed on Apr. 15, 2021.

(51) Int. Cl.
| | |
|---|---|
| *H02M 3/00* | (2006.01) |
| *H02M 1/08* | (2006.01) |
| *H02M 1/12* | (2006.01) |
| *H02M 3/335* | (2006.01) |
| *H02M 7/217* | (2006.01) |

(52) U.S. Cl.
CPC ............. *H02M 3/01* (2021.05); *H02M 1/081* (2013.01); *H02M 1/083* (2013.01); *H02M 3/33523* (2013.01); *H02M 1/12* (2013.01); *H02M 7/217* (2013.01)

(58) Field of Classification Search
CPC .......... H02M 1/12; H02M 3/01; H02M 7/217
See application file for complete search history.

(56) References Cited

U.S. PATENT DOCUMENTS

| | | |
|---|---|---|
| 2013/0044526 A1 | 2/2013 | Soua |
| 2017/0229972 A1* | 8/2017 | Cerqueira Pinto Bezerra |
| | | Varajão ................. H02M 7/797 |

FOREIGN PATENT DOCUMENTS

EP 2827490 A1 1/2015

OTHER PUBLICATIONS

Samadaei Emad et al: "A 13-Levels Module (K-Type) With Two DC Sources for Multilevel Inverters", IEEE Transactions on Industrial Electronics, IEEE Service Center, Piscataway, NJ, USA, vol. 66, No. 7, Jul. 1, 2019, total 10 pages, XP011712557.

(Continued)

*Primary Examiner* — Gary A Nash
(74) *Attorney, Agent, or Firm* — Conley Rose, P.C.

(57) ABSTRACT

A matrix power converter includes an AC input port arranged to receive three phase power. The AC input port is connected to an input filter arranged to filter switching harmonics of the three phases of the received AC power. The input filter is connected to a 3-to-2 phase matrix converter arranged to convert the three phases of the received AC power to a two phases of AC power. The 3-to-2 phase converter is connected to a primary side of a load transformer arranged to receive the two phases of the AC power. A secondary side of the load transformer is connected to an AC-to-DC converter. The matrix power converter is characterized in that the 3-to-2 phase converter includes a nested directional switch including three power switch cell groups, one for each phase of the received AC input power.

20 Claims, 9 Drawing Sheets

(56) References Cited

OTHER PUBLICATIONS

Shao Shuai et al: "A Modular Multilevel Resonant DC-DC Converter", IEEE Transactions on Power Electronics, Institute of Electrical and Electronics Engineers, USA, vol. 35, No. 8, Dec. 24, 2019, total 12 pages, XP011785195.

Quinn C et al: "A review of planar magnetic techniques and technologies", APEC 2001. 16th. Annual IEEE Applied Power Electronics Conference and Exposition. Anaheim, CA, Mar. 4-8, 2001; New York, NY: IEEE, US, vol. 2, Mar. 4, 2001, total 9 pages, XP010536139.

Samadaei Emad et al: "A Square T-Type (ST-Type) Module for Asymmetrical Multilevel Inverters", IEEE Transactions on Power Electronics, Institute of Electrical and Electronics Engineers, USA, vol. 33, No. 2, Feb. 1, 2018, total 9 pages, XP011672516.

Raju Manchala Naini et al: "Modular multilevel converters technology: a comprehensive study on its topologies, modelling, control and applications", IET Power Electronics, IET, UK, vol. 12, No. 2, Feb. 20, 2019, total 15 pages, XP006083874.

Jin Feng et al: "Multi-phase multi-level LLC resonant converter with low voltage stress on the primary-side switches", 2014 IEEE Energy Conversion Congress and Exposition (ECCE), IEEE, Sep. 14, 2014, total 7 pages, XP032680638.

Mokhberdoran Ataollah et al: "Symmetric and Asymmetric Design and Implementation of New Cascaded Multilevel Inverter Topology", IEEE Transactions on Power Electronics, Instituteand Electronics Engineers, USA, vol. 29, No. 12, Dec. 1, 2014, total 27 pages, XP011556062.

Lukas Schrittwieser. et al, "99% Efficient Isolated Three-Phase Matrix-Type DAB Buck-Boost PFC Rectifier," IEEE Transactions on Power Electronics, vol. 35, No. 1, Jan. 2020, 20 pages.

H.Q.S Dang,et al, "A New Implementation of High Voltage, High Frequency Direct Power Converter," University of Nottingham, School of Electrical and Electronic Engineering, Jul. 16, 2006, 9 pages.

Félix Rojas.et al., "A Solid State Transformer based on a three-phase to single-phase Modular Multilevel Converter for Power Distribution Networks," 2017 IEEE Southern Power Electronics Conference (SPEC), Dec. 4, 2017, 6 pages.

Maurizio Catucci et al., "ZCS Predictive Controllers for High Frequency AC-Link Resonant Converter," 12th International Power Electronics and Motion Control Conference, Jul. 4, 2006, 6 pages.

Li Yuzhuo et al: "Systematic Synthesis and Derivation of Multilevel Converters Using Common Topological Structures With Unified Matrix Models", IEEE Transactions On Power Electronics, Institute of Electrical and Electronics Engineers, USA, vol. 35, No. 6, Oct. 21, 2019, total 20 pages.

* cited by examiner

RESONANT TANK 116

INPUT FILTER 104

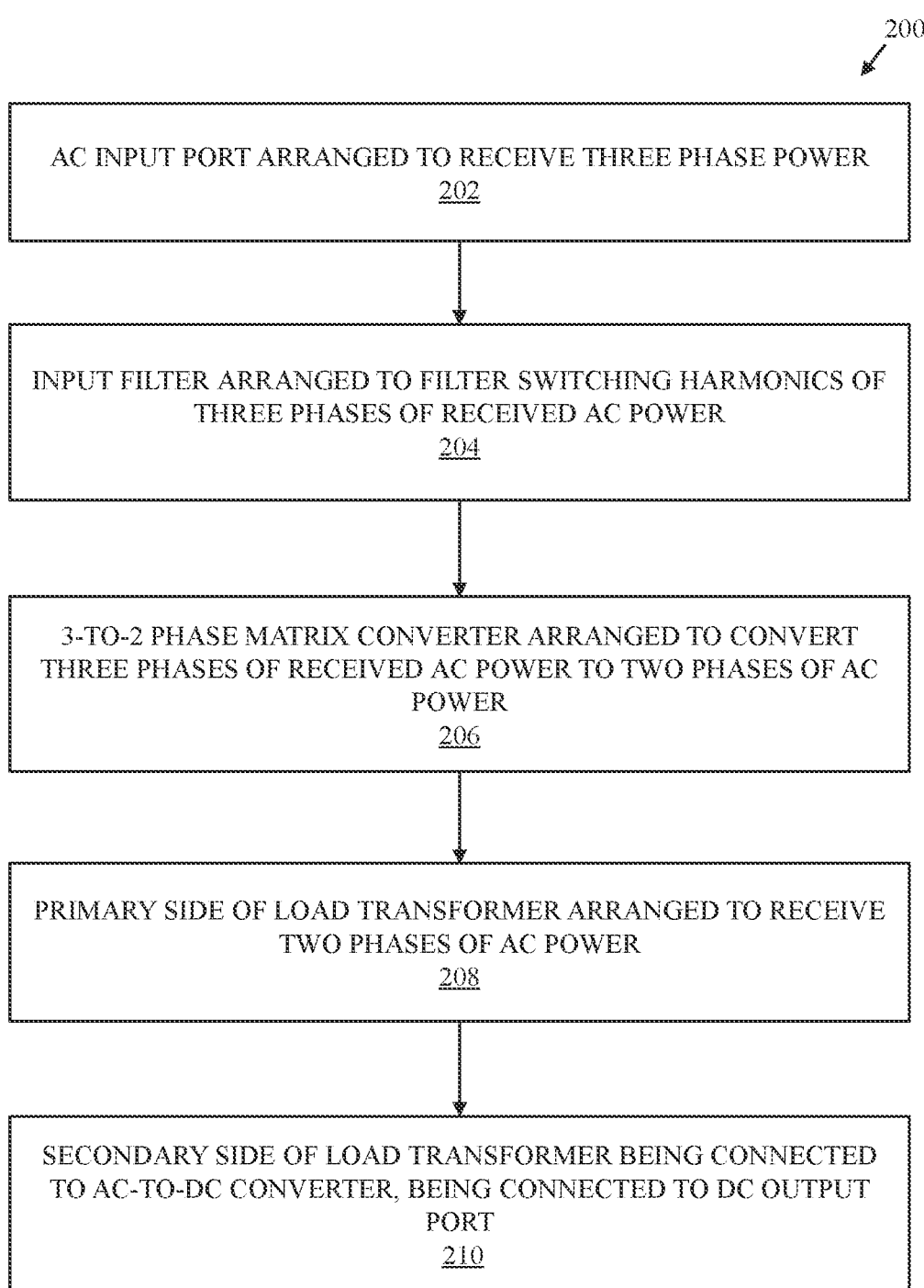

200

AC INPUT PORT ARRANGED TO RECEIVE THREE PHASE POWER
202

INPUT FILTER ARRANGED TO FILTER SWITCHING HARMONICS OF
THREE PHASES OF RECEIVED AC POWER
204

3-TO-2 PHASE MATRIX CONVERTER ARRANGED TO CONVERT
THREE PHASES OF RECEIVED AC POWER TO TWO PHASES OF AC
POWER
206

PRIMARY SIDE OF LOAD TRANSFORMER ARRANGED TO RECEIVE
TWO PHASES OF AC POWER
208

SECONDARY SIDE OF LOAD TRANSFORMER BEING CONNECTED
TO AC-TO-DC CONVERTER, BEING CONNECTED TO DC OUTPUT
PORT
210

FIG. 2A

200

3-TO-2 PHASE CONVERTER IS MATRIX PHASE CONVERTER
COMPRISING NESTED DIRECTIONAL SWITCH COMPRISING THREE
POWER SWITCH CELL GROUPS, ONE FOR EACH PHASE OF
RECEIVED AC INPUT POWER, WHEREIN EACH POWER SWITCH
CELL GROUP COMPRISES ONE OR MORE POWER SWITCH CELLS,
WHEREIN EACH POWER SWITCH CELL COMPRISES PLURALITY OF
POWER SWITCHES CONNECTED IN SERIES, EACH POWER SWITCH
COMPRISING BI-DIRECTIONAL SWITCH AND CAPACITOR,
WHEREIN POWER SWITCHES IN POWER SWITCH CELL ARE
CONNECTED IN NESTED MANNER
212

RECEIVING SWITCH COMMAND
214

PROVIDING GATE SIGNALS CONTROLLING BI-DIRECTIONAL
SWITCHES OF 3-TO-1 PHASE CONVERTER TO PROVIDE
SWITCHING MAINTAINING OPERATIONS PARAMETER BASED ON
COST FUNCTION FOR THAT OPERATIONS PARAMETER
216

FIG. 2B

MATRIX POWER CONVERTER AND METHOD FOR USE IN THE MATRIX POWER CONVERTER

CROSS-REFERENCE TO RELATED APPLICATIONS

This application is a continuation of International Patent Application No. PCT/EP2021/059796, filed on Apr. 15, 2021, the disclosure of which is hereby incorporated by reference in its entirety.

TECHNICAL FIELD

The present disclosure relates generally to the field of an alternating current (AC) to a direct current (DC) power converter or vice-versa and more particularly to a matrix power converter and a method for use in the matrix power converter.

BACKGROUND

Generally, an AC-to-DC power converter is configured to convert an AC voltage level to another DC voltage level. The conventional AC-to-DC or DC-to-AC power converters may be used in various fields. In an example, the conventional AC-to-DC power converter may be used in a datacenter application in order to translate a medium voltage (MV) grid supply (i.e., AC power) into DC power which may be used to operate an IT equipment (e.g., a router, a network switch, an internet modem, and the like). In another example, the conventional DC-to-AC power converter may be used in either a renewable energy device such as a photo-voltaic device or a wind energy device in order to transform one DC voltage level into another AC voltage level for interconnecting to power grids. In all these typical application scenarios, the conventional AC-to-DC or DC-to-AC power converters are required to be isolated between both ports (e.g., an input port and an output port) for safety. The isolation between the conventional AC-to-DC or DC-to-AC power converters is obtained by use of a galvanic isolated transformer. The galvanic isolated transformer is operated at a frequency of 50-60 hertz (Hz) in typical application scenarios. For example, a datacenter load is fed using the conventional AC-to-DC power converter with isolation. An input AC power is supplied by use of the MV grid and the isolation and voltage transformation is performed by use of the 50 Hz galvanic isolated transformer which results in an increase in size, weight and cost of the conventional AC-to-DC or DC-to-AC power converters, hence, seldom used. However, in current application scenarios, the galvanic isolated transformer is operated at higher frequencies more than 50 Hz (e.g., 10-50 kilohertz (Hz)) in order to reduce the size, weight and cost of the conventional AC-to-DC or DC-to-AC power converters.

Currently, certain attempts have been made to reduce the size, weight and cost of the conventional AC-to-DC or DC-to-AC power converters. For example, a conventional AC-to-DC power converter (e.g., resonant type converter) may use a conventional input-series out parallel (ISOP) structure. The conventional ISOP structure includes multiple low voltage converter structures which are connected in series to achieve the MV at grid side (i.e., the input side) of the conventional AC-to-DC power converter (i.e., resonant type converter) using low voltage semiconductor devices. In the conventional AC-to-DC power converter (i.e., resonant type converter), galvanic isolation between the medium voltage grid side (i.e., the input side or input port) and low voltage (i.e., the output side or output port) is achieved by use of medium-to-high frequency transformer(s). Due to the modularity and high frequency operation, the conventional ISOP structure provides a partially reduced size, weight and cost of the conventional AC-to-DC power converter (i.e., resonant type converter). However, the conventional ISOP structure uses a high count and volume of semiconductor components and overall components (or devices), high DC link capacitor volume (e.g., compensate for 100 Hz power ripple in each cell), complexity of control due to multi-cell arrangement and maximum efficiency that is limited due to switching losses. Therefore, due to limitation of high voltage semiconductor components (or devices), the conventional AC-to-DC power converter (i.e., resonant type converter) are rarely used for MV applications. Thus, there exists a technical problem of a conventional power converter (i.e., AC-to-DC or DC-to-AC power converter) with increased size, weight, cost and limited efficiency.

Therefore, in light of the foregoing discussion, there exists a need to overcome the aforementioned drawbacks associated with the conventional AC-to-DC or DC-to-AC power converters.

SUMMARY

The present disclosure provides a matrix power converter and a method for use in the matrix power converter. The present disclosure provides a solution to the existing problem of a conventional power converter (i.e., AC-to-DC or DC-to-AC power converter) with increased size, weight, cost and limited efficiency. An objective of the present disclosure is to provide a solution that overcomes at least partially the problems encountered in other power converters and provides a matrix power converter and a method for use in the matrix power converter.

One or more objectives of the present disclosure is achieved by the solutions provided in the enclosed independent claims. Advantageous implementations of the present disclosure are further defined in the dependent claims.

In one aspect, the present disclosure provides a matrix power converter comprising an AC input port arranged to receive three phase power. The AC input port is connected to an input filter arranged to filter the switching harmonics of the three phases of the received AC power. The input filter is connected to a 3-to-2 phase matrix converter arranged to convert the three phases of the received AC power to a two phases of AC power. The 3-to-2 phase converter is connected to a primary side of a load transformer arranged to receive the two phases of the AC power. A secondary side of the load transformer is connected to an AC-to-DC converter. The AC-to-DC converter is connected to a DC output port. The matrix power converter is characterized in that the 3-to-2 phase converter is a matrix phase converter comprising a nested directional switch comprising three power switch cell groups, one for each phase of the received AC input power, wherein each power switch cell group comprises one or more power switch cells wherein each power switch cell comprises a plurality of power switches connected in series, each power switch comprising a bi-directional switch and a capacitor, wherein the power switches in a power switch cell are connected in a nested manner.

The disclosed matrix power converter manifests a reduced size, weight and cost due to use of the nested directional switch. The nested directional switch is based on low-voltage power switches which react much faster than high-voltage power switches, hence, the disclosed matrix power converter manifests faster switching times. The low-voltage power switches enables the disclosed matrix power converter to have a low cost and provide a high voltage output with bi-directional flow. The disclosed matrix power converter manifests a potential for high frequency operation due to its soft switching which minimize semiconductor losses and allows a compact design. The high frequency operation of the low-voltage power switches without hard switching enables the matrix power converter to have a high efficiency. Furthermore, the matrix power converter eliminates the usage of bulky energy storage elements, such as electrolytic capacitors, etc. hence, volume and weight of the disclosed matrix power converter is significantly reduced. Additionally, the operation of the matrix power converter with the three phases AC power eliminates 100 Hz power ripples in contrast to a conventional ISOP structure with individual single phase power processing, used in a conventional AC-to-DC converter. The 3-to-2 phase matrix converter provides a direct AC-to-AC conversion from 3 phases to 2 phases.

In an implementation form, number of input AC phases are more than 3.

The disclosed matrix power converter may be used with more than 3 (e.g., 5 or 7) input AC phases.

In a further implementation form, each power switch cell group comprises two power switch cells arranged to convert three phases of the incoming AC power to two phases, and wherein the 3-to-2 phase converter further comprises a resonant tank connected to the power switch cell groups and wherein the resonant tank comprises a resonant inductor and a resonant capacitor arranged for generating AC resonant across the primary side of the load transformer.

Inside the 3-to-2 phase matrix converter, the nested directional switch is used in combination with the resonant tank which enables soft switching of the matrix power converter at various operations parameter, such as a resonant operation, sinusoidal input current or voltage and the like.

In a further implementation form, the load transformer is connected in series to the resonant capacitor and resonant inductor.

By virtue of connecting the load transformer in series with the resonant capacitor and resonant inductor, the matrix power converter is configured to switch at resonant frequency of the resonant tank, resulting into elimination or reduction of switching losses.

In a further implementation form, the matrix power converter is arranged for Zero Current Switching.

The zero current switching enforces a current flowing through a semiconductor device to switch to zero, therefore, resulting into elimination or reduction of switching losses during turn-on and turn-off times of the semiconductor device.

In a further implementation form, the load transformer is connected in parallel to the resonant capacitor and the resonant inductor.

By virtue of connecting the load transformer in parallel with the resonant capacitor and resonant inductor, the matrix power converter is configured to switch at resonant frequency of the resonant tank, resulting into elimination or reduction of switching losses.

In a further implementation form, the matrix power converter is arranged for Zero Voltage Switching.

The zero voltage switching enforces a voltage across a semiconductor device to switch to zero, therefore, resulting into elimination or reduction of switching losses during turn-on and turn-off times of the semiconductor device.

In a further implementation form, the bi-directional switch of each power switch is clamped to the capacitor of the power switch.

The bi-directional switch of each power switch is clamped to the capacitor of the power switch in order to provide a faster switching (e.g., less than 1 micro-second (µs)) of the matrix power converter at various operations parameters.

In a further implementation form, the input AC current is a high-voltage or medium-voltage power and each power switch comprises low-voltage components.

The low voltage components react much faster in comparison to high-voltage components and provides high-voltage output with bi-directional flow. Therefore, use of the low voltage components results in faster switching times, low cost, and a compact design of the matrix power converter.

In a further implementation form, the secondary side of the load transformer is connected with an AC/DC converter feeding a load.

Due to connection of the secondary side of the load transformer with the AC-to-DC converter, the two phase AC power is converter into DC power which is further used to feed the load (e.g., a battery of an electronic vehicle).

In a further implementation form, the transformer is constructed in a printed circuit board.

The construction (e.g., mounting) of the transformer in the printed circuit board enables a compact design of the matrix power converter.

In a further implementation form, the matrix power converter further comprises a controller configured to receive a switch command and to provide gate signals controlling the bi-directional switches of the 3-to-2 phase converter to provide a switching maintaining an operations parameter based on a cost function for that operations parameter.

The bi-directional switches of the 3-to-2 phase matrix converter are controlled in order to maintain switching at various operations parameter, such as a resonant operation, sinusoidal input current or voltage and the like.

In a further implementation form, the switching is determined by a plurality of switching patterns being analyzed and wherein the cost function is applied to each switching pattern and the switching pattern with the lowest cost is utilized.

The utilization of switching pattern with the lowest cost results into low cost of the matrix power converter.

In a further implementation form, the 3-to-2 phase converter comprises the controller.

The controller of the 3-to-2 phase matrix converter controls switching of the matrix power converter at various operations parameters.

In another aspect, the present disclosure provides a method for use in the matrix power converter comprising an AC input port arranged to receive three phase power of the AC input port that is connected to an input filter arranged to filter the switching harmonics of the three phases of the received AC power. The input filter is connected to a 3-to-2 phase matrix converter arranged to convert the three phases of the received AC power to a two phases of AC power. The 3-to-2 phase converter is connected to a primary side of a load transformer arranged to receive the two phases of the AC power. A secondary side of the load transformer is connected to an AC-to-DC converter. The AC-to-DC converter is connected to a DC output port, wherein the 3-to-2 phase converter is a matrix phase converter comprising a nested directional switch comprising three power switch cell groups, one for each phase of the received AC input power, wherein each power switch cell group comprises one or more power switch cells, wherein each power switch cell comprises a plurality of power switches connected in series, each power switch comprising a bi-directional switch and a capacitor, wherein the power switches in a power switch cell are connected in a nested manner. The method comprises receiving a switch command and providing gate signals controlling the bi-directional switches of the 3-to-2 phase converter to provide a switching maintaining an operations parameter based on a cost function for that operations parameter.

The disclosed method achieves all the advantages and effects of the matrix power converter of the present disclosure.

In a yet another aspect, the present disclosure provides a computer-readable medium carrying computer instructions that when loaded into and executed by the controller of the matrix power converter enables the matrix power converter to implement the method.

The controller of the matrix power converter achieves all the advantages and effects of the matrix power converter after execution of the method.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 2A and 2B collectively is a flowchart of a method for use in the matrix power converter in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
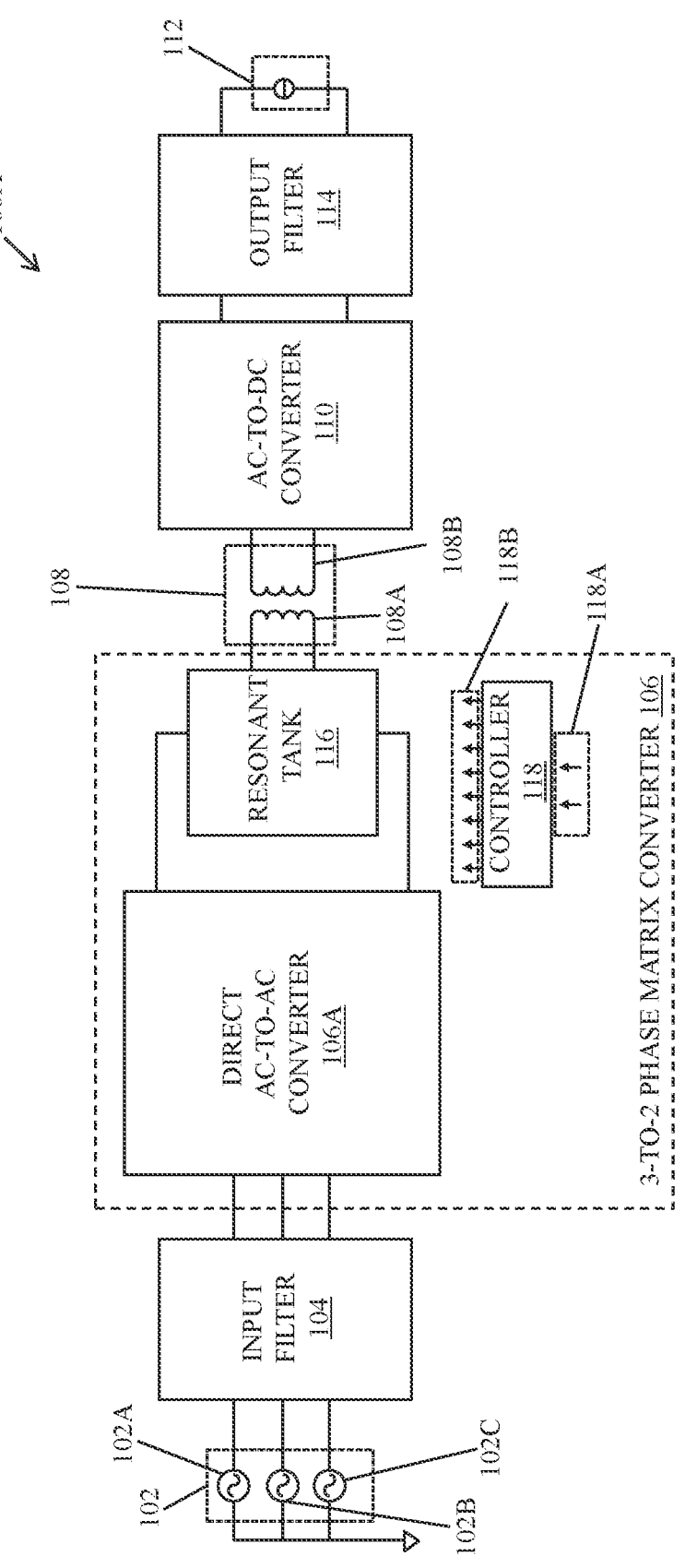
FIGS. 1A and 1B collectively is an illustration that represents various exemplary components of a matrix power converter in accordance with an embodiment of the present disclosure.
Figure 1B:

FIGS. 1A and 1B collectively is an illustration that represents various exemplary components of a matrix power converter in accordance with an embodiment of the present disclosure. With reference to FIG. 1A, there is shown a block diagram of a matrix power converter 100A that includes an AC input port 102, an input filter 104, a 3-to-2 phase matrix converter 106, a load transformer 108, an AC-to-DC converter 110, a DC output port 112 and an output filter 114. The AC input port 102 is configured to receive three phases power, such as a first phase AC power 102A, a second phase AC power 102B and a third phase AC power 102C. The 3-to-2 phase matrix converter 106 includes a direct AC-to-AC converter 106A, a resonant tank 116 and a controller 118. The controller 118 includes a switch command 118A and a plurality of gate signals 118B. The load transformer 108 includes a primary side 108A and a secondary side 108B. Each of the AC input port 102, the 3-to-2 phase matrix converter 106, the load transformer 108, the DC output port 112, the switch command 118A and the plurality of gate signals 118B is represented by a dashed rectangular box, which is used for illustration purpose only and does not form a part of circuitry.

Now referring to FIG. 1B, there is shown an internal switching arrangement of the matrix power converter 100A. With reference to FIG. 1B, there is shown an internal switching arrangement of the 3-to-2 phase matrix converter 106 of the matrix power converter 100A. The 3-to-2 phase matrix converter 106 further includes a nested directional switch 120 that comprises three power switch cell groups, such as a first power switch cell group 122, a second power switch cell group 124 and a third power switch cell group 126. Each of the first power switch cell group 122, the second power switch cell group 124 and the third power switch cell group 126 includes a first power switch cell 122A, 124A, 126A and a second power switch cell 122B, 124B, 126B, respectively. Each of the first power switch cells 122A, 124A, 126A and the second power switch cells 122B, 124B, 126B, includes a plurality of power switches. The first power switch cell 122A includes a plurality of power switches 128 (e.g., 6). For sake of simplicity, the plurality of power switches 128 associated with the first power switch cell 122A is shown in FIG. 1B. The plurality of power switches 128 associated with the first power switch cell 122A of the first power switch cell group 122 further includes a first power switch 128A. A second power switch, a third power switch and so on, of the plurality of power switches 128, are not shown here, for sake of simplicity. Furthermore, the first power switch 128A includes a bi-directional switch 130 and a capacitor 132.

In operation, the matrix power converter 100A comprises the AC input port 102 arranged to receive three phase power. The AC input port 102 of the matrix power converter 100A is configured to receive three phase AC power. The three phase AC power includes the first phase AC power 102A, the second phase AC power 102B and the third phase AC power 102C. In an implementation scenario, the first phase AC power 102A, the second phase AC power 102B and the third phase AC power 102C may have a phase difference of 120° with respect to each other. The matrix power converter 100A may also be referred to as a matrix direct power converter or resonant matrix converter.

The AC input port 102 is connected to the input filter 104 arranged to filter the switching harmonics of the three phases of the received AC power. The input filter 104 is configured to filter switching harmonics of the three phases (i.e., the first phase AC power 102A, the second phase AC power 102B and the third phase AC power 102C) of the received AC power. Generally, switching harmonics may be defined as higher frequencies, for example, integral multiples of a fundamental frequency (or a reference signal or a waveform) which may get superimposed on the fundamental frequency (or the reference signal or the waveform) and generate a distorted wave pattern(s).

The input filter 104 is connected to the 3-to-2 phase matrix converter 106 arranged to convert the three phases of the received AC power to a two phases of AC power. The 3-to-2 phase matrix converter 106 is configured to transform the three phases (i.e., the first phase AC power 102A, the second phase AC power 102B and the third phase AC power 102C) into the two phases of AC power. The 3-to-2 phase matrix converter 106 includes the direct AC-to-AC converter 106A which is same as the 3-to-2 phase matrix converter 106. Alternatively stated, the 3-to-2 phase matrix converter 106 may also be referred to as the direct AC-to-AC converter 106A. The reason being that the direct AC-to-AC converter 106A is configured to convert an input AC power (e.g., three phases AC power) into an output AC power (e.g., two phases AC power). The 3-to-2 phase matrix converter 106 may also be referred to as the 3-to-2 phase converter.

The 3-to-2 phase converter 106 (i.e., the 3-to-2 phase matrix converter 106) is connected to the primary side 108A of the load transformer 108 arranged to receive the two phases of the AC power. The 3-to-2 phase matrix converter 106 is further connected to the primary side 108A of the load transformer 108. In this way, the load transformer 108 is configured to receive the two phases of the AC power transformed by the 3-to-2 phase matrix converter 106. In the matrix power converter 100A, the load transformer 108 may also be referred to as a transformer.

Figure 3A:
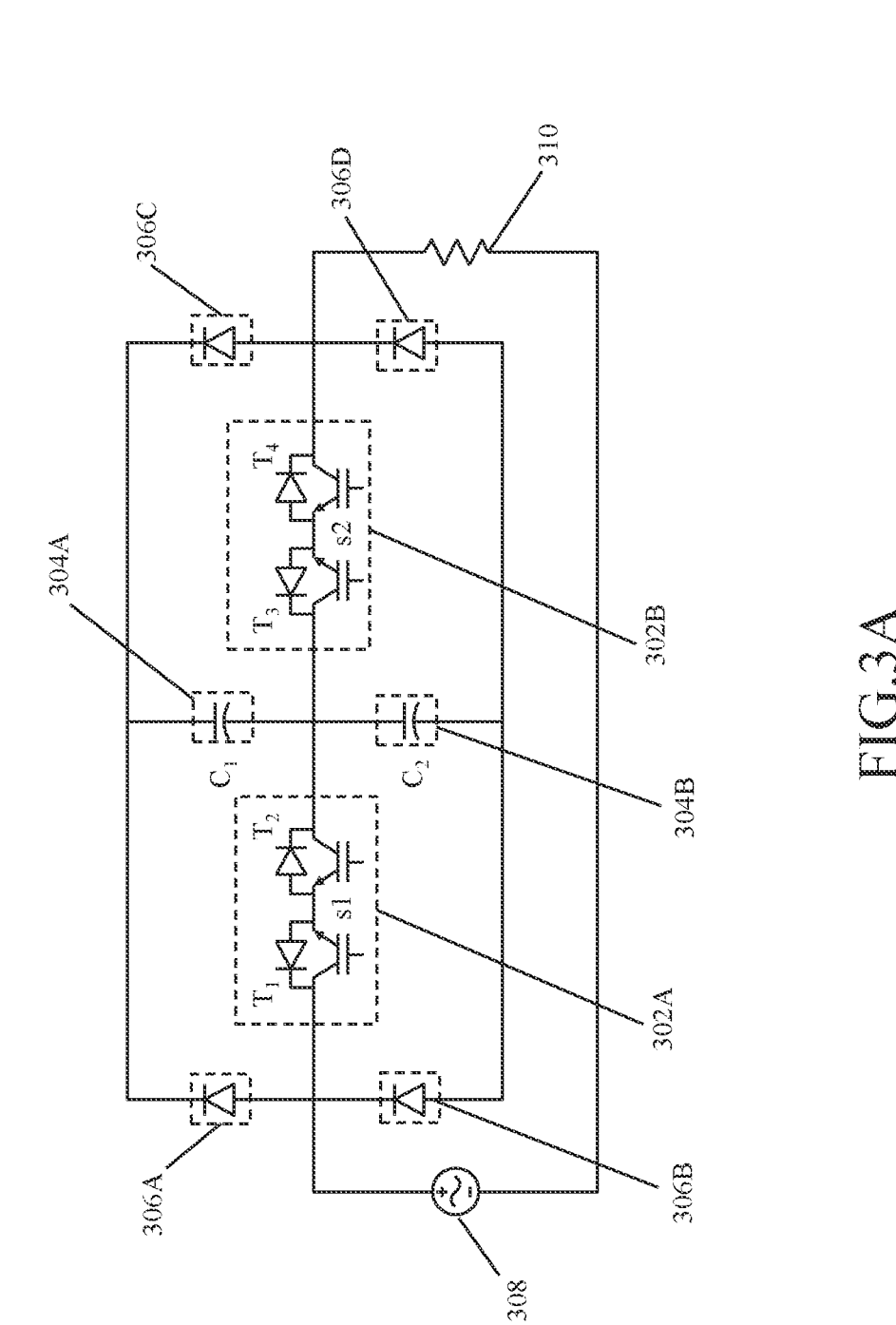
FIG. 3A is a circuit diagram of a nested bi-directional switch in accordance with an embodiment of the present disclosure.
Figure 3B:
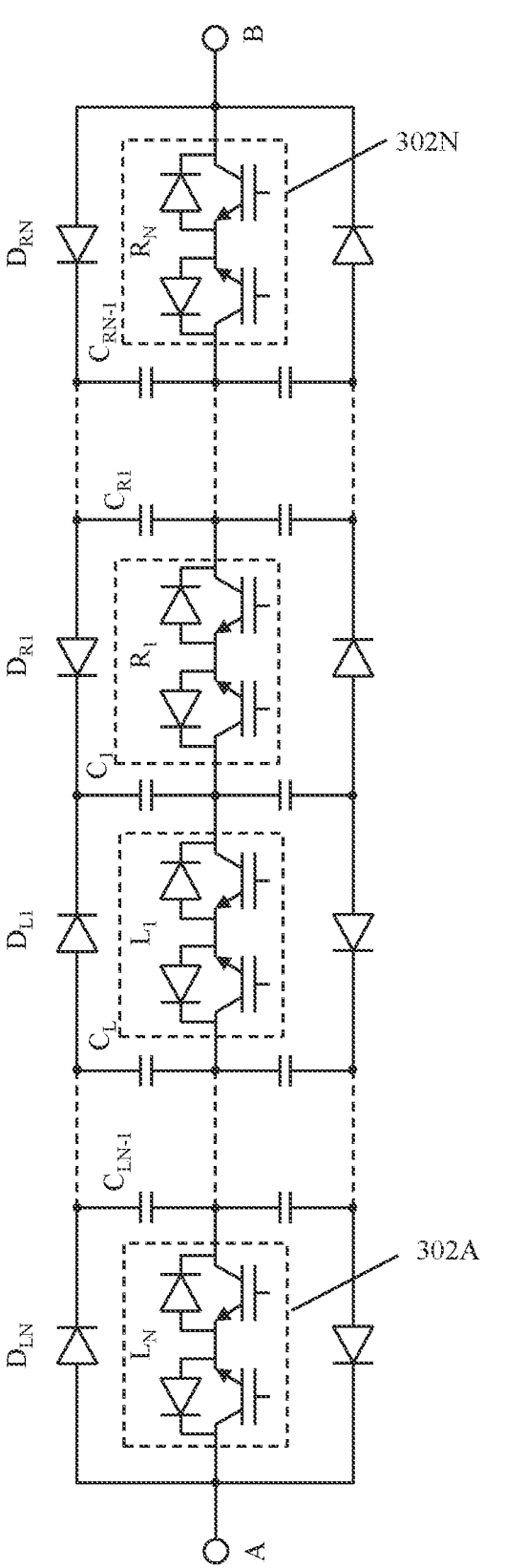
FIG. 3B is a circuit diagram of a N-level nested bi-directional switch in accordance with an embodiment of the present disclosure.

The secondary side 108B of the load transformer 108 is connected to the AC-to-DC converter 110, being connected to the DC output port 112, wherein the matrix power converter 100A is characterized in that the 3-to-2 phase converter 106 is a matrix phase converter comprising the nested directional switch 120 comprising three power switch cell groups, one for each phase of the received AC input power, wherein each power switch cell group comprises one or more power switch cells, wherein each power switch cell comprises the plurality of power switches 128 connected in series, each power switch comprising the bi-directional switch 130 and the capacitor 132, wherein the power switches in a power switch cell are connected in a nested manner. The secondary side 108B of the load transformer 108 is connected to the AC-to-DC converter 110 in order to transform the AC power received from the 3-to-2 phase matrix converter 106 into a DC output power. The DC output power is obtained from the DC output port 112 which is connected to the AC-to-DC converter 110 through the output filter 114. Moreover, the 3-to-2 phase matrix converter 106 of the matrix power converter 100A comprises the nested directional switch 120 (shown in FIG. 1B). The nested directional switch 120 comprises three power switch cell groups, such as the first power switch cell group 122, the second power switch cell group 124 and the third power switch cell group 126. Each of the first power switch cell group 122, the second power switch cell group 124 and the third power switch cell group 126 is configured to receive one phase of the received AC input power. For example, the first power switch cell group 122 is configured to receive the first phase AC power 102A, the second power switch cell group 124 is configured to receive the second phase AC power 102B and the third power switch cell group 126 is configured to receive the third phase AC power 102C. Moreover, each of the first power switch cell group 122, the second power switch cell group 124 and the third power switch cell group 126 comprises the one or more power switch cells depending on number of phases, one power switch cell for one phase. In an example, in order to convert a three phases AC power into a single phase AC power, each of the first power switch cell group 122, the second power switch cell group 124 and the third power switch cell group 126 comprises one power switch cell. In another example, in order to convert a three phases AC power into a two phases AC power, each of the first power switch cell group 122, the second power switch cell group 124 and the third power switch cell group 126 comprises two power switch cells. Similarly, in order to convert a three phases AC power into a three phases AC power, each of the first power switch cell group 122, the second power switch cell group 124 and the third power switch cell group 126 comprises three power switch cells. Furthermore, in the matrix power converter 100A, each of the first power switch cell group 122, the second power switch cell group 124 and the third power switch cell group 126 comprises two power switch cells. The first power switch cell group 122 comprises the first power switch cell 122A and the second power switch cell 122B. Similarly, the second power switch cell group 124 and the third power switch cell group 126 comprises the first power switch cell 124A and 126A and the second power switch cell 124B and 126B, respectively. Further, each power switch cell comprises the plurality of power switches, such as the first power switch cell 122A of the first power switch cell group 122 comprises the plurality of power switches 128 (e.g., 6 power switches) connected in series. Each power switch, such as the first power switch 128A of the plurality of power switches 128 of the first power switch cell 122A comprises the bi-directional switch 130 and the capacitor 132. The plurality of power switches 128 comprised by the first power switch cell 122A of the first power switch cell group 122 is connected in the nested manner. Similarly, the plurality of power switches comprised by the second power switch cell 122B of the first power switch cell group 122, the first and second power switch cells, 124A and 124B of the second power switch cell group 124 and the first and second power switch cells, 126A and 126B of the third power switch cell group 126 is connected in the nested manner to form the nested directional switch 120. The nested directional switch 120 may also be referred to as a nested bi-directional switch. A circuit diagram of the nested bi-directional switch and a N-level nested bi-directional switch is shown in FIGS. 3A and 3B, respectively.

In accordance with an embodiment, the number of input AC phases are more than 3. In the matrix power converter 100A, the number of input AC phases (or the phases of AC input power) may be used more than 3, such as 5 phases or 7 phases.

In accordance with an embodiment, each power switch cell group comprises two power switch cells arranged to convert three phases of the incoming AC power to two phases, and wherein the 3-to-2 phase converter 106 further comprises the resonant tank 116 connected to the power switch cell groups and wherein the resonant tank 116 comprises a resonant inductor and a resonant capacitor arranged for generating AC resonant across the primary side 108A of the transformer 108. Each of the first power switch cell group 122, the second power switch cell group 124 and the third power switch cell group 126 comprises two power switch cells, such as the first power switch cell 122A, 124A, 126A, and the second power switch cell 122B, 124B, 126B, respectively. Moreover, the 3-to-2 phase converter 106 (i.e., the 3-to-2 phase matrix converter) comprises the resonant tank 116 (shown in FIG. 1B). The resonant tank 116 is connected to each of the first power switch cell group 122, the second power switch cell group 124 and the third power switch cell group 126. Moreover, the resonant tank 116 comprises the resonant inductor and the resonant capacitor (shown in FIGS. 4A and 4B). The resonant tank 116 with the resonant inductor and the resonant capacitor is arranged for generating AC resonant frequencies across the primary side 108A of the load transformer 108. Generally, an AC resonant frequency of a circuit is defined as a frequency at which impedances or admittances negate each other and the circuit starts oscillating at a frequency of a relative maximum amplitude.

In accordance with an embodiment, the bi-directional switch 130 of each power switch is clamped to the capacitor 132 of the power switch. For example, the bi-directional switch 130 of the first power switch 128A of the plurality of power switches 128 associated with the first power switch cell 122A of the first power switch cell group 122 is clamped to the capacitor 132 of the first power switch 128A to enable faster switching of the matrix power converter 100A. The switching of the matrix power converter 100A is performed very quickly (e.g., less than 1 micro-second (μs)).

In accordance with an embodiment, the input AC current is a high-voltage or medium-voltage power and each power switch comprises low-voltage components. The input AC current generated by the input three phases AC power (e.g., the first phase AC power 102A, the second phase AC power 102B and the third phase AC power 102C) may be either high-voltage or medium-voltage power. Additionally, each power switch (e.g., the first power switch 128A) comprises low voltage components or devices (e.g., semiconductor devices) and the low voltage components react much faster in comparison to high-voltage components and provides high-voltage output with bi-directional flow. Therefore, use of the low voltage components results in faster switching times, low cost, and a compact design of the matrix power converter 100A.

In accordance with an embodiment, the secondary side 108B of the transformer 108 is connected with the AC-to-DC converter 110 feeding a load. The secondary side 108B of the transformer 108 (i.e., the load transformer 108) is connected with the AC-to-DC converter 110 in order to transform the AC power obtained from the 3-to-2 phase matrix converter 106 into the DC output power. The DC output power is filtered by use of the output filter 114 and fed to the load through the DC output port 112. The load may be an IT equipment, such as a router, a network switch, an internet modem, and the like, an electrical vehicle (EV) charging station (e.g., a battery), data center power supply equipment and the like.

In accordance with an embodiment, the transformer 108 is constructed in a printed circuit board. For example, the transformer 108 (i.e., the load transformer 108) may be mounted on the printed circuit board (PCB) in order to have a compact design of the matrix power converter 100A.

In accordance with an embodiment, the matrix power converter 100A further comprises the controller 118 configured to receive the switch command 118A and to provide gate signals 118B controlling the bi-directional switches of the 3-to-2 phase converter 106 to provide a switching maintaining an operations parameter based on a cost function for that operations parameter. The controller 118 is configured to receive the switch command 118A and provide the gate signals 118B (shown in FIG. 1A) in order to control the bi-directional switches (e.g., the bi-directional switch 130 of the first power switch 128A of the plurality of power switches 128 of the first power switch cell 122A of the first power switch cell group 122) of the 3-to-2 phase matrix converter 106. The bi-directional switches of the 3-to-2 phase matrix converter 106 are controlled in order to maintain switching of the matrix power converter 100A at various operations parameter, such as a resonant operation, sinusoidal input current or voltage and the like, on the basis of the cost function associated with that operations parameter.

In accordance with an embodiment, the switching is determined by a plurality of switching patterns being analyzed and wherein the cost function is applied to each switching pattern and the switching pattern with the lowest cost is utilized. The switching of the matrix power converter 100A is determined by use of a switching algorithm where the plurality of switching patterns is analyzed and the switching pattern with the lowest cost is utilized for maintaining switching of the matrix power converter 100A at various operations parameter, such as the resonant operation, sinusoidal input current or voltage and the like.

In accordance with an embodiment, the plurality of switching patterns relate to the switch command 118A. The plurality of switching patterns may be generated by the switch command 118A associated with controller 118 of the matrix power converter 100A.

In accordance with an embodiment, the 3-to-2 phase converter 106 comprises the controller 118. The controller 118 comprised by the matrix power converter 100A is same as the controller 118 comprised by the 3-to-2 phase matrix converter 106.

Thus, the matrix power converter 100A, uses low-voltage power switches (e.g., the first power switch 128A) based nested directional switches (e.g., the nested directional switch 120) which uses quasi-multilevel operation to increase an effective voltage blocking capability. By virtue of low-voltage power switches (or semiconductor devices), the matrix power converter 100A manifests a low cost and provides a high voltage output with bi-directional flow. Additionally, the low-voltage power switches are much faster than high-voltage power switches, therefore, the matrix power converter 100A manifests faster switching times. Due to the effective voltage blocking capability that is obtained by use of the nested directional switches (e.g., the nested directional switch 120), the matrix power converter 100A manifests lower conduction losses as resistance is proportional to blocking voltage, $R\alpha(V_{blocking})^{2.5}$. The nested directional switch 120 in combination with the resonant tank 116 enables soft switching of the matrix power converter 100A at various operations parameter, such as a resonant operation, sinusoidal input current or voltage and the like. The matrix power converter 100A may use a medium or high frequency transformer to galvanically isolate and to perform voltage transformation (1:N) for a follow-up low voltage converter(s). Moreover, the matrix power converter 100A manifests a potential for high frequency ($f_{sw}$) operation which further allows lower switching losses and a compact design also. The high frequency operation of the low-voltage power switches without hard switching enables the matrix power converter 100A to have higher efficiency and the size of passive components, such as the input filter 104, the load transformer 108 and the resonant tank 116 can be significantly reduced in comparison to a situation at which the matrix power converter 100A is operated at lower frequencies. Furthermore, the matrix power converter 100A eliminates the usage of bulky energy storage elements, such as electrolytic capacitors, etc. hence, volume and weight of the matrix power converter 100A is significantly reduced. The operation of the matrix power converter 100A with the three phases AC power may eliminate the 100 Hz power ripples in contrast to a conventional ISOP structure used in a conventional AC-to-DC converter. Therefore, the matrix power converter 100A may be used in AC-to-DC, DC-to-AC or AC-to-AC power converters where medium or high voltage levels may be easily achieved. The matrix power converter 100A may be used in various industrial applications, such as an EV charging station, data center power supplies or integrating generated solar energy or wind energy to power grids.

FIGS. 2A and 2B collectively is a flowchart of a method for use in the matrix power converter, in accordance with an embodiment of the present disclosure. FIGS. 2A and 2B are described in conjunction with elements from FIGS. 1A and 1B. With reference to FIGS. 2A and 2B, there is shown a method 200 for use in the matrix power converter 100A (of FIGS. 1A and 1B). The method 200 includes steps 202-to-216 (steps 202-210 of the method 200 are shown in FIG. 2A and steps 212-216 are shown in FIG. 2B). The method 200 is executed by the matrix power converter 100A, described in detail, for example, in FIGS. 1A and 1B.

The present disclosure provides a method (i.e., the method 200) for use in the matrix power converter 100A comprising an AC input port arranged to receive three phase power, the AC input port being connected to an input filter arranged to filter the switching harmonics of the three phases of the received AC power; the input filter being connected to a 3-to-2 phase matrix converter arranged to convert the three phases of the received AC power to a two phases of AC power, the 3-to-2 phase converter being connected to a primary side of a load transformer arranged to receive the two phases of the AC power, the secondary side of the load transformer being connected to an AC-to-DC converter, being connected to a DC output port, wherein the 3-to-2 phase converter is a matrix phase converter comprising a nested directional switch comprising three power switch cell groups, one for each phase of the received AC input power, wherein each power switch cell group comprises one or more power switch cells, wherein each power switch cell comprises a plurality of power switches connected in series, each power switch comprising a bi-directional switch and a capacitor, wherein the power switches in a power switch cell are connected in a nested manner, and wherein the method 200 comprises receiving a switch command and providing gate signals controlling the bi-directional switches of the 3-to-2 phase converter to provide a switching maintaining an operations parameter based on a cost function for that operations parameter.

With reference to FIG. 2A, at step 202, an AC input port (e.g., the AC input port 102 of FIG. 1A) of the matrix power converter 100A is arranged to receive three phase AC power. In the matrix power converter 100A, the three phase AC power includes the first phase AC power 102A, the second phase AC power 102B and the third phase AC power 102C.

At step 204, the AC input port 102 is connected to an input filter (e.g., the input filter 104 of FIG. 1A) which is arranged to filter the switching harmonics of the three phases of the received AC power. The input filter 104 of the matrix power converter 100A is configured to filter switching harmonics of the three phases (i.e., the first phase AC power 102A, the second phase AC power 102B and the third phase AC power 102C) of the received AC power.

At step 206, the input filter 104 is connected to a 3-to-2 phase matrix converter (e.g., the 3-to-2 phase matrix converter 106 of FIG. 1A) arranged to convert the three phases of the received AC power to a two phases of AC power. The 3-to-2 phase matrix converter 106 is configured to transform the three phases (i.e., the first phase AC power 102A, the second phase AC power 102B and the third phase AC power 102C) into the two phases of AC power.

At step 208, the 3-to-2 phase converter 106 is connected to a primary side (e.g., the primary side 108A of FIG. 1A) of a load transformer (e.g., the load transformer 108 of FIG. 1A), arranged to receive the two phases of the AC power. The load transformer 108 is configured to receive the two phases of the AC power transformed by the 3-to-2 phase matrix converter 106.

At step 210, a secondary side (e.g., the secondary side 108B) of the load transformer 108 is connected to an AC-to-DC converter (e.g., the AC-to-DC converter 110), being connected to a DC output port (e.g., the DC output port 112). The secondary side 108B of the load transformer 108 is connected to the AC-to-DC converter 110 in order to transform the AC power received from the 3-to-2 phase matrix converter 106 into a DC output power. The DC output power is obtained from the DC output port 112 which is connected to the AC-to-DC converter 110 through the output filter 114.

Now referring to FIG. 2B, at step 212, the 3-to-2 phase converter 106 is a matrix phase converter comprising a nested directional switch (e.g., the nested directional switch 120 of FIG. 1B) comprising three power switch cell groups (e.g., the first power switch cell group 122, the second power switch cell group 124, and the third power switch cell group 126, of FIG. 1B), one for each phase of the received AC input power, wherein each power switch cell group (i.e., the first power switch cell group 122, the second power switch cell group 124, and the third power switch cell group 126) comprises one or more power switch cells (e.g., the first power switch cells 122A, 124A, 126A, and the second power switch cells 122B, 124B, 126B, respectively, of FIG. 1B), wherein each power switch cell comprises a plurality of power switches (e.g., the plurality of power switches 128 of FIG. 1B) connected in series, each power switch (e.g., the first power switch 128A of FIG. 1B) comprising a bi-directional switch (e.g., the bi-directional switch 130 of FIG. 1B) and a capacitor (e.g., the capacitor 132 of FIG. 1B), wherein the power switches in a power switch cell are connected in a nested manner. Each of the first power switch cell group 122, the second power switch cell group 124 and the third power switch cell group 126 comprises two power switch cells, such as the first power switch cell 122A, 124A, 126A, and the second power switch cell 122B, 124B, 126B, respectively. Each of the first power switch cells 122A, 124A, 126A, and the second power switch cells 122B, 124B, 126B, comprises the plurality of power switches which are connected in the nested manner.

At step 214, the method 200 comprises receiving a switch command (e.g., the switch command 118A of FIG. 1A). The switch command 118A is associated with the controller 118 in order to control switching of the bi-directional switches.

At step 216, the method 200 further comprises providing gate signals (e.g., the plurality of gate signals 118B of FIG. 1A) controlling the bi-directional switches (i.e., the bi-directional switch 130 of FIG. 1B) of the 3-to-2 phase converter 106 to provide a switching maintaining an operations parameter based on a cost function for that operations parameter. The plurality of gate signals 118B associated with the controller 118 in order to control switching of the bi-directional switches (e.g., the bi-directional switch 130 of the first power switch 128A of the plurality of power switches 128 of the first power switch cell 122A of the first power switch cell group 122) of the 3-to-2 phase matrix converter 106. The bi-directional switches of the 3-to-2 phase matrix converter 106 are controlled in order to maintain switching at various operations parameter, such as a resonant operation, sinusoidal input current or voltage and the like, on the basis of the cost function associated with that operations parameter.

Thus, the method 200 provides soft switching of the matrix power converter 100A due to use of the low voltage power switches based nested directional switch 120 along with the resonant tank 116. The nested directional switch 120 uses quasi-multilevel operation to increase an effective voltage blocking capability of the matrix power converter 100A. The method 200 enables the matrix power converter 100A to have a reduced size, weight, cost, lower switching and conduction losses and faster switching times.

The steps 202 to 216 are only illustrative and other alternatives can also be provided where one or more steps are added, one or more steps are removed, or one or more steps are provided in a different sequence without departing from the scope of the claims herein.

In accordance with an embodiment, a computer-readable medium carrying computer instructions that when loaded into and executed by the controller 118 of the matrix power converter 100A enables the matrix power converter 100A to implement the method 200 (of FIGS. 2A and 2B).

FIG. 3A is a circuit diagram of a nested bi-directional switch, in accordance with an embodiment of the present disclosure. FIG. 3A is described in conjunction with elements from FIGS. 1A, 1B, 2A, and 2B. With reference to FIG. 3A, there is shown a circuit architecture of a nested bi-directional switch 300A. The nested bi-directional switch 300A includes a first power switch 302A (also represented as s1), a second power switch 302B (also represented as s2), a first capacitor 304A (also represented as $C_1$), a second capacitor 304B (also represented as $C_2$), a first diode 306A, a second diode 306B, a third diode 306C, a fourth diode 306D, an AC input power 308 and an output resistor 310. Each of the first power switch 302A (i.e., s1), the second power switch 302B (i.e., s2), the first capacitor 304A (i.e., $C_1$), the second capacitor 304B (i.e., $C_2$), the first diode 306A, the second diode 306B, the third diode 306C, and the fourth diode 306D is represented as a dashed rectangular box, which is used for illustration purpose only, and does not form a part of circuitry. The number of power switches in the nested bi-directional switch 300A may be extended to number N, hence, forming a N-level nested bi-directional switch, shown in FIG. 3B.

The nested bi-directional switch 300A uses quasi-multilevel operation to increase an effective voltage blocking capability. The nested bi-directional switch 300A uses the method 200 (of FIGS. 2A and 2B) in order to operate the matrix power converter 100A (of FIGS. 1A and 1B). The first capacitor 304A (i.e., $C_1$) and the second capacitor 304B (i.e., $C_2$) are used for intermediate voltages, required for transients (several tens or hundreds of nano-seconds) between various switch levels. Moreover, each of the first diode 306A, the second diode 306B, the third diode 306C and the fourth diode 306D is used to maintain charge and transients of each of the first capacitor 304A (i.e., $C_1$) and the second capacitor 304B (i.e., $C_2$), hence, are rated for much smaller current in comparison to each of the first power switch 302A (i.e., s1) and the second power switch 302B (i.e., s2).

FIG. 3B is a circuit diagram of a N-level nested bi-directional switch, in accordance with an embodiment of the present disclosure. FIG. 3B is described in conjunction with elements from FIGS. 1A, 1B, 2A, 2B, and 3A. With reference to FIG. 3B, there is shown a circuit architecture of a N-level nested bi-directional switch 300B. The N-level nested bi-directional switch 300B includes N number of power switches, such as a first power switch 302A and up to a Nth power switch 302N. The N number of power switches, such as the first power switch 302A up to the Nth power switch 302N, are bi-directional and even in number.

The high-voltage switches of the matrix power converter 100A are composed of either the nested bi-directional switch 300A or the N-level nested bi-directional switch 300B. The functions and working of the N-level nested bi-directional switch 300B is same as that of the nested bi-directional switch 300A.

Figure 4A:
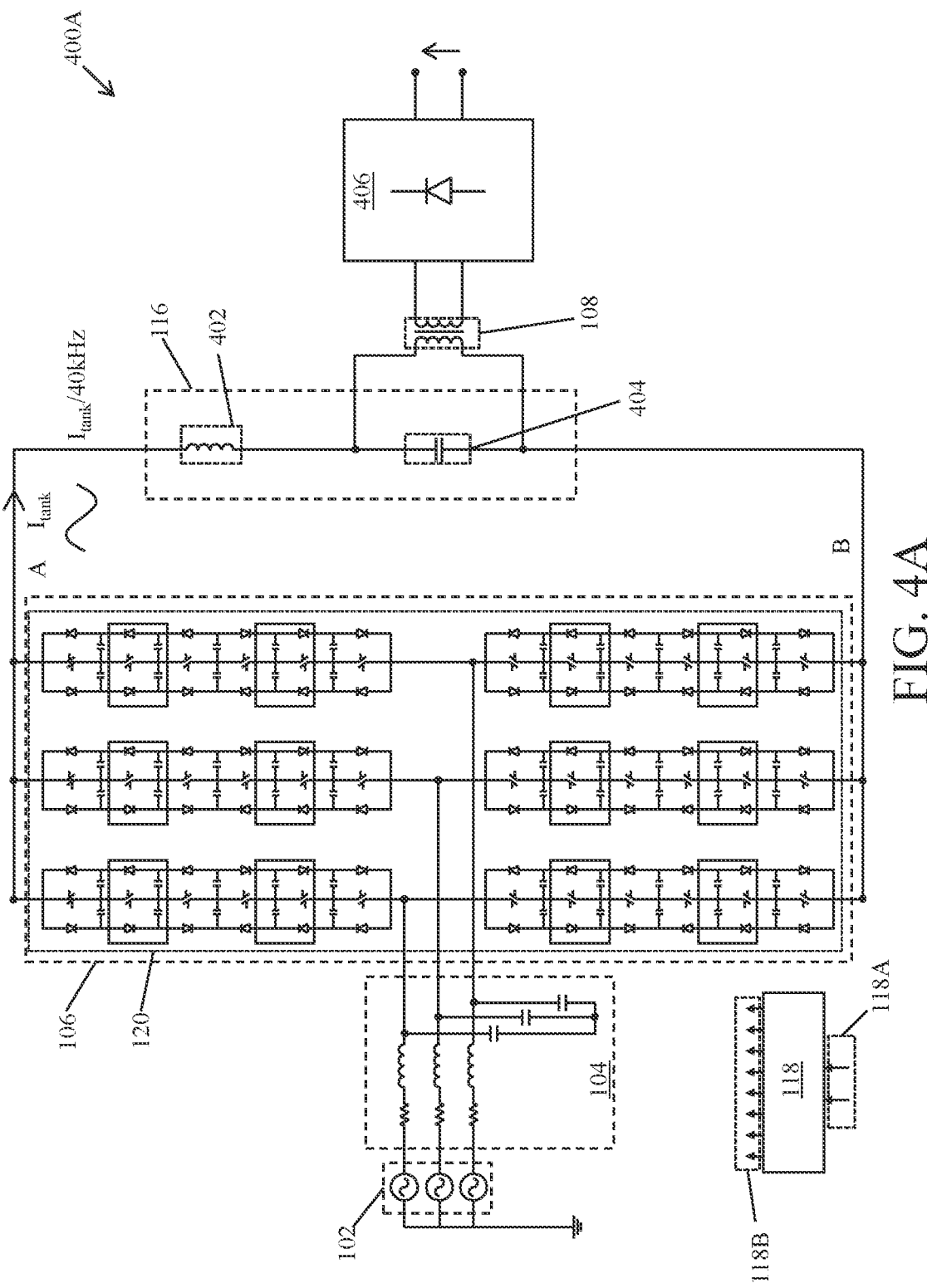
FIG. 4A is a circuit diagram of the matrix power converter in combination with a series resonant tank with parallel loaded configuration in accordance with an embodiment of the present disclosure.

FIG. 4A is a circuit diagram of the matrix power converter in combination with a series resonant tank with parallel loaded configuration, in accordance with an embodiment of the present disclosure. FIG. 4A is described in conjunction with elements from FIGS. 1A, 1B, 2A, 2B, 3A, and 3B. With reference to FIG. 4A, there is shown a circuit architecture 400A of the matrix power converter 100A (of FIGS. 1A and 1B) in combination with the resonant tank 116. The resonant tank 116 is connected in series with the matrix power converter 100A. The resonant tank 116 includes a resonant inductor 402 and a resonant capacitor 404. In the circuit architecture 400A, the matrix power converter 100A is provided with three phase AC input power of 10 kilo volt (kV) with frequency of 50 Hz or 60 Hz providing a current (e.g., $I_{tank}$) that flows through the nested directional switch 120 and then, to the resonant tank 116. The circuit architecture 400A further includes a load 406 (e.g., a diode or a rectifier) that may be connected in series with the resonant tank 116. Each of the AC input port 102, the input filter 104, the 3-to-2 phase matrix converter 106, the load transformer 108, the resonant tank 116, the resonant inductor 402, the resonant capacitor 404, the controller 118, the switch command 118A, the plurality of gate signals 118B and the nested directional switch 120 is represented by a dashed rectangular box, which is used for illustration purpose only and does not form a part of circuitry.

In the circuit architecture 400A, the 3-to-2 phase matrix converter 106 is feeding the resonant tank 116 connected in series with the matrix power converter 100A. However, in another implementation, the 3-to-2 phase matrix converter 106 may be used either as a 3-to-1 phase matrix converter, or a 3-to-3 phase matrix converter. Additionally, the input filter 104 comprises a resistor in series with an inductor connected to a capacitor for each of the three phases of the received AC power, wherein three capacitors are commonly connected.

In accordance with an embodiment, the resonant inductor 402 and the resonant capacitor 404 are connected in series. In the circuit architecture 400A, the resonant inductor 402 and the resonant capacitor 404 of the resonant tank 116 are connected in series. Therefore, the resonant tank 116 may also be referred to as a series resonant tank.

In accordance with an embodiment, the load transformer 108 is connected in parallel to the resonant capacitor 404. In the circuit architecture 400A, the load transformer 108 (of FIG. 1A) is connected in parallel to the resonant capacitor 404.

In accordance with an embodiment, the load transformer 108 is connected in parallel to the resonant inductor 402. Optionally, the load transformer 108 (of FIG. 1A) may be connected in parallel to the resonant inductor 402.

In accordance with an embodiment, the matrix power converter 100A is arranged for Zero Current Switching. In the circuit architecture 400A, the matrix power converter 100A is configured to switch at resonant frequency of the resonant tank 116, therefore, the matrix power converter 100A enables zero current switching (ZCS). Generally, zero current switching may be defined as a switching topology that uses a resonance technique in order to force a current flowing through a semiconductor device, switch to zero, resulting into elimination or reduction of switching losses during turn-on and turn-off times of the semiconductor device.

Additionally, the AC input power at grid side may be extended to more than three phases (e.g., 5 or 7) in certain application scenarios. Optionally, the AC input power at grid side may be used at less than three phases (e.g., 1 or 2), however, power pulsation is inevitable at point AB, therefore, practical applications may have negligible benefits.

Figure 4B:
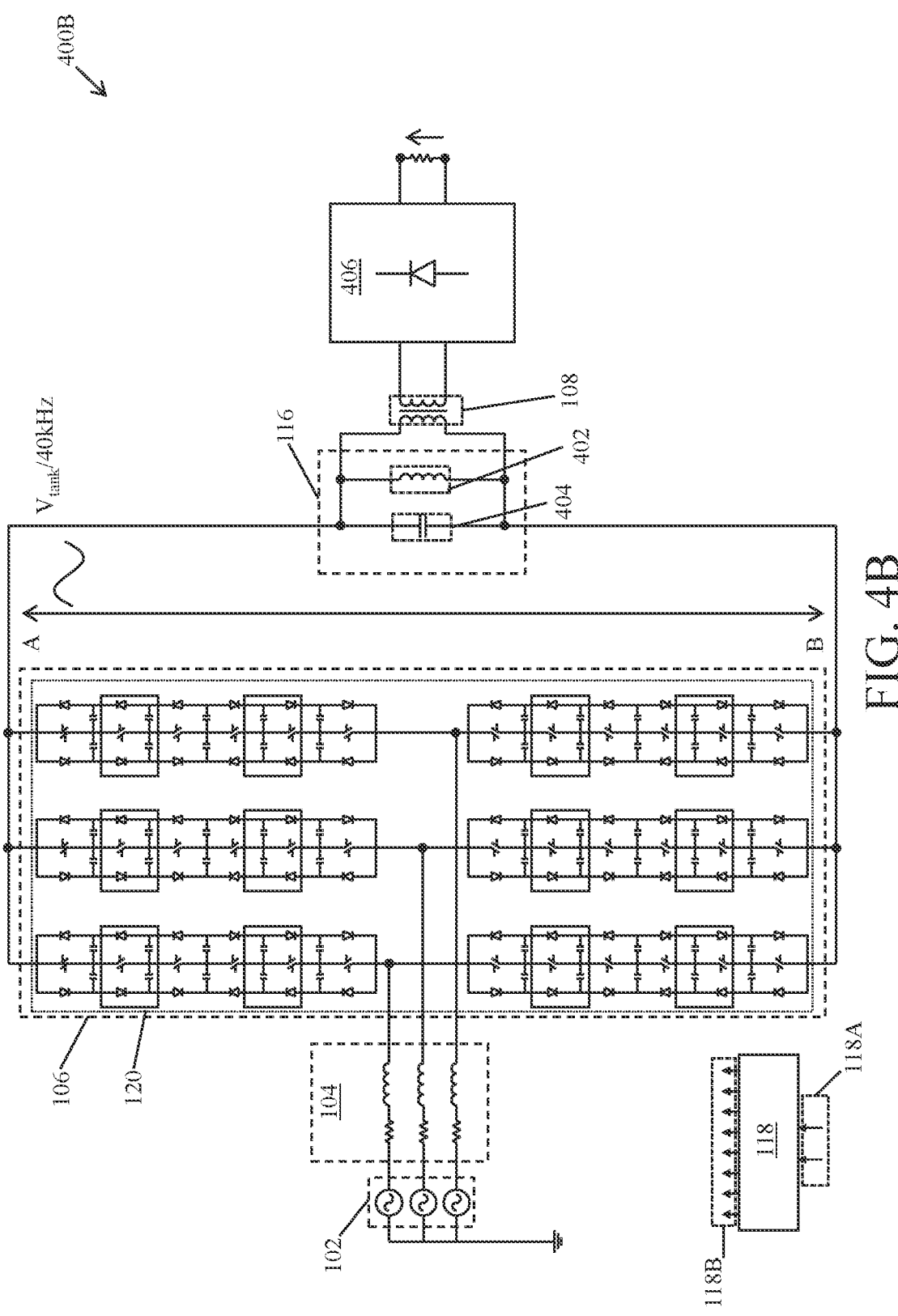
FIG. 4B is a circuit diagram of the matrix power converter in combination with a parallel resonant tank in accordance with an embodiment of the present disclosure.

FIG. 4B is a circuit diagram of the matrix power converter in combination with a parallel resonant tank, in accordance with an embodiment of the present disclosure. FIG. 4B is described in conjunction with elements from FIGS. 1A, 1B, 2A, 2B, 3A, 3B, and 4A. With reference to FIG. 4B, there is shown a circuit architecture 400B of the matrix power converter 100A (of FIGS. 1A and 1B) in combination with the resonant tank 116. The resonant tank 116 is connected in parallel with the matrix power converter 100A. In the circuit architecture 400B, the matrix power converter 100A is provided with three phase AC input power of 10 kV with frequency of 50 Hz or 60 Hz at grid side. The three phase AC input power of 10 kV provides a voltage (e.g., $V_{tank}$) across the resonant tank 116. The circuit architecture 400B further includes the load 406 (e.g., a diode or a rectifier) that may be connected in series with the resonant tank 116.

In the circuit architecture 400B, the 3-to-2 phase matrix converter 106 is feeding the resonant tank 116 connected in parallel with the matrix power converter 100A. However, in another implementation, the 3-to-2 phase matrix converter 106 may be used either as a 3-to-1 phase matrix converter, or a 3-to-3 phase matrix converter. Additionally, the input filter 104 comprises a resistor in series with an inductor for each of the three phases of the received AC power.

In accordance with an embodiment, the resonant inductor 402 and the resonant capacitor 404 are connected in parallel. In the circuit architecture 400B, the resonant inductor 402 and the resonant capacitor 404 of the resonant tank 116 are connected in parallel. Therefore, the resonant tank 116 may also be referred to as a parallel resonant tank.

In accordance with an embodiment, the load transformer 108 is connected in parallel to the resonant capacitor 404 and the resonant inductor 402. In the circuit architecture 400B, the load transformer 108 (of FIG. 1A) is connected in parallel to the resonant capacitor 404 as well as the resonant inductor 402.

In accordance with an embodiment, the matrix power converter 100A is arranged for Zero Voltage Switching. In the circuit architecture 400B, the matrix power converter 100A is configured to switch at resonant frequency of the resonant tank 116, therefore, the matrix power converter 100A enables zero voltage switching (ZVS). Generally, zero voltage switching may be defined as the case when the semiconductor switching occurs, the voltage across the switch is zero or close to zero, resulting into elimination or reduction of switching losses during turn-on and turn-off times of the semiconductor device.

Additionally, the AC input power at grid side may be extended to more than three phases (e.g., 5 or 7) in certain application scenarios. Optionally, the AC input power at grid side may be used at less than three phases (e.g., 1 or 2), however, power pulsation is inevitable at point AB, therefore, practical applications may have negligible benefits.

Figure 4C:
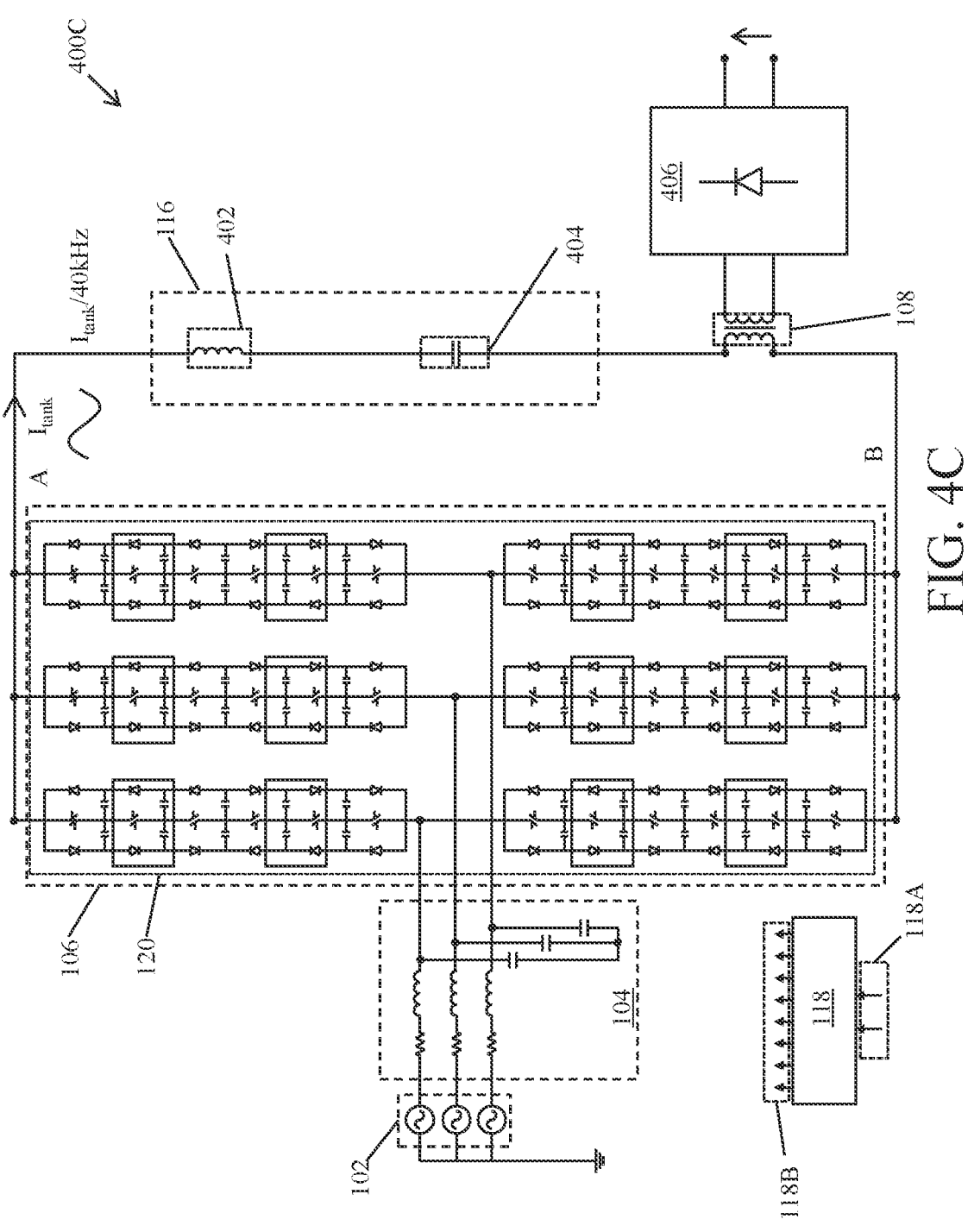
FIG. 4C is a circuit diagram of the matrix power converter in combination with a series resonant tank with series loaded configuration in accordance with an embodiment of the present disclosure.

FIG. 4C is a circuit diagram of the matrix power converter in combination with a series resonant tank with series loaded configuration, in accordance with another embodiment of the present disclosure. FIG. 4C is described in conjunction with elements from FIGS. 1A, 1B, 2A, 2B, 3A, 3B, 4A, and 4B. With reference to FIG. 4C, there is shown a circuit architecture 400C of the matrix power converter 100A (of FIGS. 1A and 1B) in combination with the resonant tank 116 with series loaded configuration. The resonant tank 116 is connected in series with the matrix power converter 100A. In the circuit architecture 400C, the matrix power converter 100A is provided with three phase AC input power of 10 kilo volt (kV) with frequency of 50 Hz or 60 Hz providing a current (e.g., $I_{tank}$) that flows through the nested directional switch 120 and then, to the resonant tank 116. The circuit architecture 400C further includes the load 406 (e.g., a diode or a rectifier) that may be connected in series with the resonant tank 116.

In the circuit architecture 400C, the 3-to-2 phase matrix converter 106 is feeding the resonant tank 116 connected in series with the matrix power converter 100A. However, in another implementation, the 3-to-2 phase matrix converter 106 may be used either as a 3-to-1 phase matrix converter, or a 3-to-3 phase matrix converter. Additionally, the input filter 104 comprises the resistor in series with the inductor connected to the capacitor for each of the three phases of the received AC power, wherein three capacitors are commonly connected.

In accordance with an embodiment, the load transformer 108 is connected in series to the resonant capacitor 404 and resonant inductor 402. In the circuit architecture 400C, the resonant inductor 402 and the resonant capacitor 404 of the resonant tank 116 are connected in series and the load transformer 108 is connected in series with the resonant tank 116.

In the circuit architecture 400C, the matrix power converter 100A is configured to switch at resonant frequency of the resonant tank 116, therefore, the matrix power converter 100A enables zero current switching (ZCS) and results into elimination or reduction of switching losses during turn-on and turn-off times of a semiconductor device.

Additionally, the AC input power at grid side may be extended to more than three phases (e.g., 5 or 7) in certain application scenarios. Optionally, the AC input power at grid side may be used at less than three phases (e.g., 1 or 2), however, power pulsation is inevitable at point AB, therefore, practical applications may have negligible benefits.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

What is claimed is:

1. A matrix power converter comprising:

an alternating current (AC) input port configured to receive AC power comprising three phases;

an input filter connected to the AC input port and configured to filter switching harmonics of the three phases of the AC power;

a 3-to-2 phase matrix converter connected to the input filter and configured to convert the three phases of the AC power to two phases of the AC power, wherein the 3-to-2 phase matrix converter comprises a nested directional switch comprising three power switch cell groups, wherein each of the power switch cell groups corresponds to a phase of the three phases of the AC power and comprises one or more power switch cells, wherein each of the power switch cells comprises a plurality of power switches connected in series, wherein each of the power switches comprises a bi-directional switch and a capacitor, wherein the bi-directional switch of each power switch is clamped to the capacitor of the power switch, and wherein the power switches in each of the power switch cells are connected in a nested manner;

a load transformer comprising a primary side and a secondary side, wherein the primary side is connected to the 3-to-2 phase matrix converter and configured to receive the two phases of the AC power;

an AC-to-direct current (DC) converter connected to the secondary side and configured to convert the two phases of the AC power to DC power; and a DC output port configured to output the DC power.

2. The matrix power converter of claim 1, wherein each of the power switch cell groups comprises two power switch cells arranged to convert the three phases of the AC power to the two phases, wherein the 3-to-2 phase matrix converter further comprises a resonant tank connected to the power switch cell groups, and wherein the resonant tank comprises a resonant inductor and a resonant capacitor configured to generate AC resonant across the primary side of the load transformer.

3. The matrix power converter of claim 2, wherein the resonant inductor and the resonant capacitor are connected in series.

4. The matrix power converter of claim 3, wherein the load transformer is connected in parallel to the resonant capacitor.

5. The matrix power converter of claim 3, wherein the load transformer is connected in parallel to the resonant inductor.

6. The matrix power converter of claim 3, wherein the load transformer is connected in series to the resonant capacitor and resonant inductor.

7. The matrix power converter of claim 3, wherein the matrix power converter is configured to provide zero current switching.

8. The matrix power converter of claim 2, wherein the resonant inductor and the resonant capacitor are connected in parallel.

9. The matrix power converter of claim 8, wherein the load transformer is connected in parallel to the resonant capacitor and the resonant inductor.

10. The matrix power converter of claim 8, wherein the matrix power converter is configured to provide zero voltage switching.

11. The matrix power converter of claim 1, wherein the AC input port is configured to receive a high-voltage power input AC current, and wherein each of the power switches comprises low-voltage components.

12. The matrix power converter of claim 1, wherein the AC/DC converter is configured to feed a load.

13. The matrix power converter of claim 1, further comprising a printed circuit board, wherein the printed circuit board comprises the load transformer.

14. The matrix power converter of claim 1, wherein the matrix power converter further comprises a controller configured to receive a switch command and to provide gate signals controlling the bi-directional switch of the 3-to-2 phase matrix converter to maintain switching of the matrix power converter at an operations parameter based on a cost function of the operations parameter.

15. The matrix power converter of claim 14, further comprising:

analyzing a plurality of switching patterns by applying the cost function to each switching pattern; and switching the matrix power converter using the switching pattern with a lowest cost.

16. The matrix power converter of claim 15, wherein the plurality of switching patterns relates to the switch command.

17. The matrix power converter of claim 14, wherein the 3-to-2 phase matrix converter comprises the controller.

18. The matrix power converter of claim 1, wherein the AC input port is configured to receive a medium-voltage power input AC current, and wherein each of the power switches comprises low-voltage components.

19. A method implemented by a matrix power converter, the method comprising:

receiving, by an alternating current (AC) input port of the matrix power converter, AC power comprising three phases;

filtering, by an input filter of the matrix power converter, switching harmonics of the three phases of the AC power;

converting, by a 3-to-2 phase matrix converter of the matrix power converter, the three phases of the AC power to two phases of the AC power;

receiving, by a primary side of a load transformer, the two phases of the AC power;

converting, by an AC-to-DC converter, the two phases of the AC power to DC power;

receiving a switch command; and providing gate signals controlling a bi-directional switch of the 3-to-2 phase matrix converter to maintain switching of the matrix power converter at an operations parameter based on a cost function for operations parameter.

20. A matrix power converter comprising:

an alternating current (AC) input port configured to receive AC power comprising three phases;

an input filter connected to the AC input port and configured to filter switching harmonics of the three phases of the AC power;

a 3-to-2 phase matrix converter connected to the input filter and configured to convert the three phases of the AC power to two phases of the AC power, wherein the 3-to-2 phase matrix converter comprises a resonant tank and a nested directional switch, wherein the nested directional switch comprises a plurality of power switch cell groups comprising one or more power switch cells, wherein each of the power switch cells comprises a plurality of power switches connected in series, wherein each of the power switches comprises a bi-directional switch and a capacitor, and wherein the power switches in each of the power switch cells are connected in a nested manner;

a load transformer comprising a primary side and a secondary side, wherein the primary side is connected to the 3-to-2 phase matrix converter and configured to receive the two phases of the AC power, and wherein the resonant tank comprises a resonant inductor and a resonant capacitor arranged for generating AC resonant across the primary side;

an AC-to-direct current (DC) converter connected to the secondary side and configured to convert the two phases of the AC power to DC power; and a DC output port configured to output the DC power.

* * * * *